US010743480B2

(12) United States Patent
Probasco

(10) Patent No.: US 10,743,480 B2
(45) Date of Patent: Aug. 18, 2020

(54) AGILE SPECTRUM GREENHOUSE LED LIGHTING FIXTURE AND CONTROL

(71) Applicant: ASTRO SPACE, LLC, Plainsboro, NJ (US)

(72) Inventor: William F. Probasco, Plainsboro, NJ (US)

(73) Assignee: ASTRO SPACE, LLC, Plainsboro, NJ (US)

( * ) Notice: Subject to any disclaimer, the term of this patent is extended or adjusted under 35 U.S.C. 154(b) by 136 days.

(21) Appl. No.: 14/790,124

(22) Filed: Jul. 2, 2015

(65) Prior Publication Data

US 2015/0305108 A1    Oct. 22, 2015

(51) Int. Cl.
| | |
|---|---|
| *A01G 22/00* | (2018.01) |
| *A01G 7/04* | (2006.01) |
| *H05B 45/00* | (2020.01) |
| *H05B 45/20* | (2020.01) |
| *H05B 47/19* | (2020.01) |

(52) U.S. Cl.
CPC ............. *A01G 22/00* (2018.02); *A01G 7/045* (2013.01); *H05B 45/00* (2020.01); *H05B 45/20* (2020.01); *H05B 47/19* (2020.01); *Y02P 60/149* (2015.11)

(58) Field of Classification Search
CPC .................................. A01G 7/04; A01G 7/045
See application file for complete search history.

(56) References Cited

U.S. PATENT DOCUMENTS

| | | | |
|---|---|---|---|
| 10,244,595 B2 | 3/2019 | Grajcar | |
| 2006/0262521 A1 | 11/2006 | Piepgras et al. | |
| 2012/0002408 A1* | 1/2012 | Lichten | F21S 8/063 362/218 |
| 2016/0278304 A1* | 9/2016 | Elsegood | A01G 9/20 |
| 2016/0353671 A1* | 12/2016 | Shaughnessy | H05B 33/00 |
| 2017/0094911 A1* | 4/2017 | Suntych | A01G 7/045 |

* cited by examiner

Primary Examiner — Kristen C Hayes
(74) Attorney, Agent, or Firm — Thomas | Horstemeyer, LLP

(57) ABSTRACT

An apparatus, including a light emitting device, including a plurality of sets of light emitting diodes, and further including a control device for controlling a light intensity of each light emitting diode of the plurality of sets of light emitting diodes is presented. Each set of the plurality of sets may be controlled by a driver. Each driver of each set of the plurality of sets may be configured to control an intensity of light emitted by each set of the plurality of sets. The control device may be programmed by a computer program to control light intensity of each set light emitting diodes of the plurality of sets of light emitting diodes based on light intensity requirements of vegetation that may be stored in the adjustment potentiometers or in the on-board computer memory via network connection or direct plugin modules.

13 Claims, 12 Drawing Sheets

AGILE SPECTRUM GREENHOUSE LED LIGHTING FIXTURE AND CONTROL

FIELD OF THE INVENTION

This invention relates to plant growth, growth chambers, and other types of growing, aquarium, and/or greenhouse environments.

BACKGROUND OF THE INVENTION

For many years greenhouses have been used to provide a suitable growing environment for various plants in areas where the climate is not optimum or conducive to their growth. Where the natural sunlight is not of sufficient intensity and/or duration needed to promote optimum growth of the desired vegetation, artificial lighting has been incorporated in growth chambers and greenhouses to provide or supplement natural sunlight. Various types of lighting have been developed over the years in an attempt to more accurately replicate natural sunlight. Until recently, the most effective types of lighting used in greenhouses, included, florescent, metal halide and high-pressure sodium vapor. Each type has its advantages and disadvantages but all provide much of the light spectrum, provided by the sun, needed to produce photosynthesis. Unfortunately, they also provide wavelengths of light that are not efficient or at all useful in supporting photosynthesis, and thus, waste energy. Recently, Light Emitting Diode (LED) lights have entered the picture, offering a more targeted spectrum of light wavelengths, while at the same time increasing lighting efficiency.

Research shows that the most efficient production of photosynthesis occurs when plants are exposed to primarily the blue and red wavelength regions of the light spectrum, referred to in the industry as Photosynthetically Active Radiation (PAR), spanning the visible spectrum from roughly 400 to 700 nm. As indicated above, legacy lighting types (florescent, metal halide, and high-pressure sodium vapor), produce full spectrum lighting and in doing so waste power in the green, yellow and orange wavelengths offering limited, if any, benefit photosynthetically. Currently available LED lighting fixtures are capable of providing some wavelengths of light required to support photosynthetic activity (PA), but are grossly limited in the number of different wavelengths, typically two, provided, and the intensity of these cannot be independently adjusted.

Further research has shown that various plants require slightly different wavelengths than others to induce optimum photosynthetic activity. In addition, a given type of plant may require more of the blue wavelength light at one point in its growth, while benefiting from a higher concentration of red wavelength light at another point (e.g., vegetative growth versus fruit developing/ripening). LED lighting has been found to be superior to other types of grow lights in providing PAR light.

Research also suggests that plants may respond positively to a slowly increasing and decreasing light source of varying wavelengths when turning on and off, mimicking that of natural sunlight over the duration of a day. Another point regarding plant growth lighting needs is that there is an upper limit to the intensity of light required to produce optimum photosynthetic activity.

SUMMARY OF THE INVENTION

One or more embodiments of the present invention are uniquely capable of not only providing the PAR required by plants, but also the shift in light spectrum, over time, as plants may require.

At least one embodiment of the present invention, is uniquely capable of providing a lighting protocol wherein a slowly increasing and decreasing light source of varying wavelengths, mimics that of natural sunlight over the duration of a day.

In at least one embodiment of the present invention, an adjustable intensity of various wavelength LEDs is provided. An apparatus, which may be called an agile photosynthetically active spectrum, LED light fixture in at least one embodiment, provides eight frequency bands (or channels) of light and in other embodiments is customized to provide more channels, accommodating most any specific need of the grower. The wavelength of any specific channel is established by choosing LEDs with the predominant wavelength (PWL) desired and placing them on a pc (printed circuit) board in a series string of LED pads of a channel in which that wavelength is wanted. In this way, up to eight channels (or more in a custom implementation) can be established for any given light fixture. Each channel may have its own intensity control that can be used to adjust the intensity of its LEDs from zero to maximum output, either manually (manual model) or through a companion agile software program (automated model). A master intensity control in one or more embodiments is also provided as a convenient means of adjusting all of the channels' intensities, simultaneously.

Each channel (wavelengths of light) in the automated models can be independently modulated real-time (as opposed to the fixed adjustment provided in the manual model) through the companion software program, enabling the user to adjust the light intensity of various wavelengths based on the time of day or year, plant growth cycle, type of plant, food ripening phase, as well as other factors. Complete control of each channel in the automated models can also be achieved through a handheld device, such as, but not limited to, an iPad (trademarked), smartphone or a computer. Adjustment may be made through a graphic user interface similar to that of an audio equalizer. However in this system, we would be adjusting the intensities of light channels rather than the sound level of each channels of audio frequency.

In one or more embodiments, a lighting system, method, and/or apparatus is provided that has the ability to adjust light intensity to meet the plants' upper limit of photon flux utilization at the required wavelengths allowing one to minimize the power used by the light, while still providing the necessary light output to produce optimum photosynthesis. None of the lighting fixture types previously available provide this wavelength/intensity adjustment combination nor a more advanced implementation of LED lighting, in which the wavelength intensities can be adjusted over time.

A panel, highly transparent to all light frequencies of interest, along with the heatsink, side panels and heat sink end caps may be combined to provide a dust seal, debris protection barrier and resistance to water and many other liquids, which are all key to maintaining performance and longevity of the light and components in the control device in a plant growing environment.

In at least one embodiment of the present invention, an apparatus is provided comprising a light emitting device including a plurality of sets of light emitting diodes, wherein each set of the plurality of sets of light emitting diodes includes one or more light emitting diodes; and further comprising a control device for controlling a light intensity of each light emitting diode of the plurality of sets of light emitting diodes.

Each set of the plurality of sets may be controlled by a driver, such that there are a plurality of drivers one for each set of the plurality of sets. Each driver of each set of the plurality of sets may be configured to control an intensity of light emitted by each set of the plurality of sets in a frequency band of light of a chosen predominant wavelength. The plurality of sets may emit a plurality of corresponding different wavelengths of light.

The control device may include a computer memory having stored therein light intensity requirements of vegetation. The control device may be programmed by a computer program to control light intensity of the each light emitting diode of the plurality of sets of light emitting diodes based on light intensity requirements of vegetation stored in the computer memory.

The apparatus may further include means to protect each of the light emitting diodes of the plurality of sets of light emitting diodes from dust, debris, insects and moisture.

Each driver of the plurality of drivers may be a direct current driver. Each driver of the plurality of drivers may be a pulse width modulated driver which reduces shift in predominant wavelength of light emitted by each set of the plurality of sets. The control device may be programmed by computer software to configure each driver of the plurality of drivers to be either a direct current driver or a pulse width modulated driver.

The apparatus may further include the vegetation itself. The apparatus may further include a means for mounting the light emitting device so that light from the plurality of sets of light emitting diodes of the light emitting device is directed onto the vegetation.

In at least one embodiment, a method is provided which may include mounting a light emitting device so that light from a plurality of sets of light emitting diodes of the light emitting device is directed toward vegetation; and controlling light intensity of light from the plurality of sets of light emitting diodes directed toward vegetation. Each set of the plurality of sets of light emitting diodes may include one or more light emitting diodes. The light emitting device may further include a control device for controlling light intensity of each set of light emitting diode of the plurality of sets of light emitting diodes. Each set of the plurality of sets may emit light in a narrow frequency band of light within a chosen predominant wavelength. The plurality of sets may emit a plurality of corresponding wavelengths of light as determined by the chosen predominant wavelength of each set of the plurality of sets.

The method may further include controlling light intensity of light from the plurality of sets of light emitting diodes directed toward the vegetation so that light intensity of each of the sets light emitting diodes follows a periodic cycle during which light intensity gradually increases in intensity to a peak intensity and then gradually decreases in intensity to an intensity low, and then gradually increases again to the peak intensity. The periodic cycle may occur over a period of a twenty-four hour day. The periodic cycle may be repeated for a plurality of cycles. The peak intensity may differ depending on a time of year. The intensity low may differ depending on a time of year. The light intensity of each set of the plurality of sets may be controlled by the control device based on light intensity sensed by a plurality of sensors, one for each set of the plurality of sets.

BRIEF DESCRIPTION OF THE DRAWINGS

FIG. 8 also shows a direction of light emitted from a plurality (pc board) of LEDs (not shown). This is an example of a horizontally mounted, vertical emitting, LED light fixture;

DETAILED DESCRIPTION OF THE DRAWINGS

Figure 1:
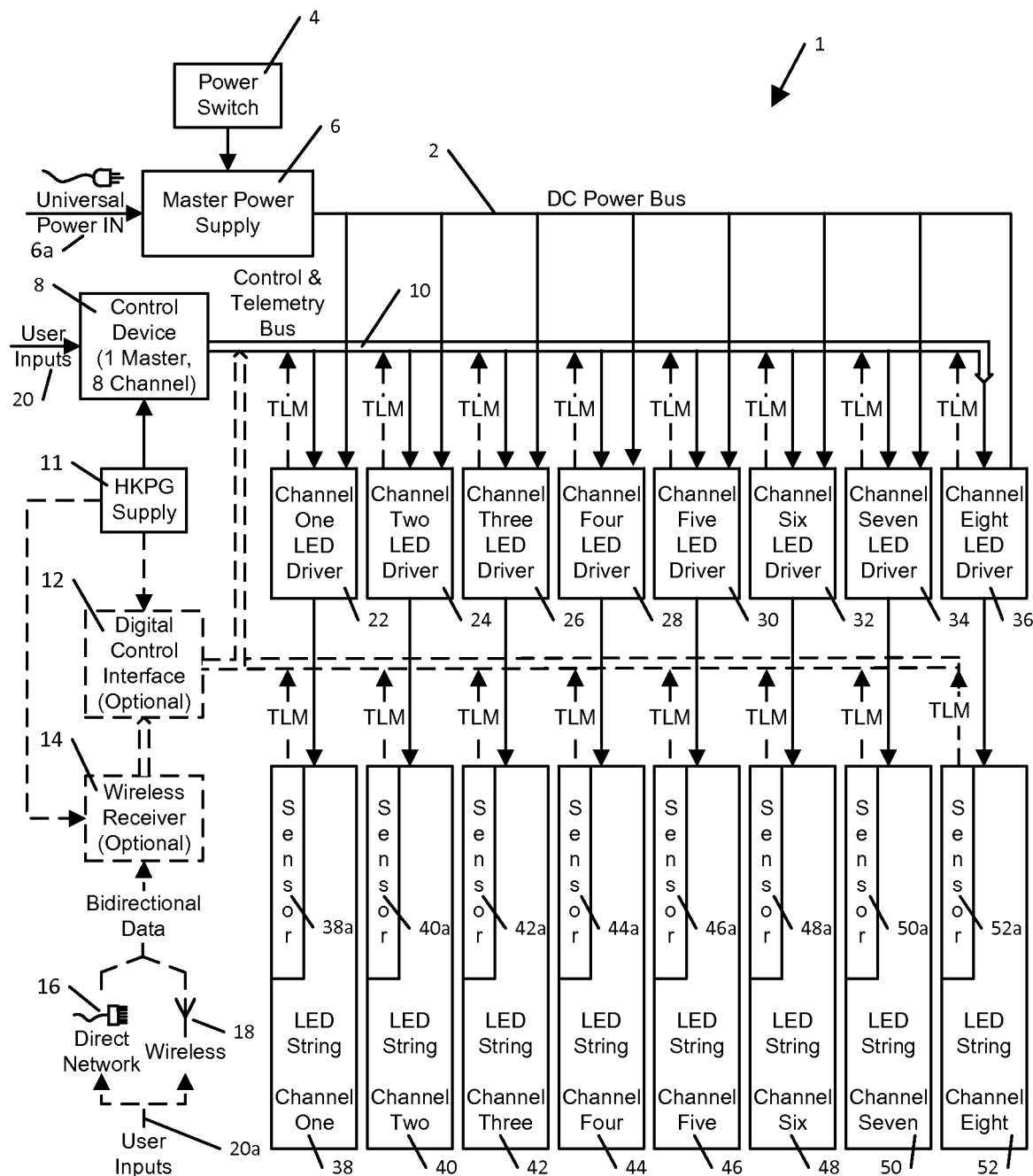
FIG. 1 shows a block diagram of a method, apparatus, and system in accordance with one or more embodiments of the present invention.

FIG. 1 shows a block diagram of a method, apparatus, and/or system 1 in accordance with one or more embodiments of the present invention.

The method, apparatus, and/or system 1 may include a master power supply 6, a power switch 4, a DC (direct current) power bus 2, a control device (one master, eight channels, one adjustable reference) 8, a control & telemetry bus, 10, a Housekeeping (HKPG) supply, 11, a digital control interface (optional), 12, a wireless receiver (optional), 14, a direct network connection, 16, a wireless connection, 18, a port, 20 or 20a, for user inputs, a first channel LED (light emitting diode) driver, 22, a second channel LED driver, 24, a third channel LED driver, 26, a fourth channel LED driver, 28, a fifth channel LED driver, 30, a sixth channel LED driver, 32, a seventh channel LED driver, 34, an eighth channel LED driver, 36, an LED string first channel, 38, an LED string second channel, 40, an LED string third channel, 42, an LED string fourth channel, 44, an LED string fifth channel, 46, an LED string sixth channel, 48, an LED string seventh channel, 50, and an LED string eighth channel, 52.

The control device, 8, may be a device which includes manual controls and or a computer processor and memory. The computer memory of the control device, 8, may be loaded with data concerning light intensity requirements for vegetation, and/or a plurality of plants. The light intensity requirements or criteria of the vegetation to be illuminated, may specify the light intensity to be provided by each LED of the plurality of sets 38, 40, 42, 44, 46, 48, 50, and 52. The light intensity of the sets 38, 40, 42, 44, 46, 48, 50, and 52 may be gradually varied independently or in concert, during a twenty-four hour day, from an intensity low at one set of PWLs of light (to mimic night time, prior to sunrise) to a peak intensity at perhaps another set of PWLs of light (i.e. to mimic noon time or whenever the sun shines brightest in the sky), and back to the intensity low at a previous or yet another set of PWLs of light (after the sun goes down) as determined by a computer program stored in computer memory of the control device, 8. The computer memory of the control device 8 may be programmed to mimic light intensity depending on different seasons of the year and or specific needs of the vegetation it is illuminating. For example, the peak intensity of light in the winter may be different than that in the summer. The computer memory of the control device, 8, may be programmed with differing peak intensities and differing low intensities for light emission, depending on time of year.

The computer memory of the control device 8 may also be programmed to provide different peak intensities, differing low intensities of light, and differing rates of change of intensity of light over the eight channels of PWL light, depending on where a plant is in its growth cycle. For example, if a plant is young, the intensity of the higher frequency (blue end of visible spectrum) PWLs of light may be greater than that of a maturing or fruit-ripening plant.

The computer memory of the control device, 8, may also be programmed to provide different peak intensities, differing low intensities of light, and differing rates of change of intensity of light over the eight channels of PWL light, depending on the type of plant.

The master power supply, 6, may include a universal input, 6a, shown in FIG. 1. The master power supply, 6, may be a voltage regulated DC (direct current) power supply with power factor correction. The master power supply, 6, may supply power to each of the eight typically independent LED channels drivers 22, 24, 26, 28, 30, 32, 34, and 36, which in turn provide drive power to their respective LED string through eight channels 38, 40, 42, 44, 46, 48, 50, and 52.

LEDs exhibit varying degrees of wavelength shift due to excitation current, of up to about 5% for some LEDs. The predominant wavelength (PWL) of LEDs also varies with die temperature. In cases where this small shift in wavelength is intolerable, it can be greatly reduced or eliminated by applying a fixed current level that is pulse width modulated (PWM) to the LEDs. Each of the LED drivers 22, 24, 26, 28, 30, 32, 34, and 36, in this lighting system, apparatus and/or method 1, can power ten series-connected, LEDs, or a string of electrically connected LEDs in one or more embodiments, by a constant direct current (DC) driver for drivers 22, 24, 26, 28, 30, 32, 34, and 36 or, where situations require the most limited shift in frequency over intensity, current drivers can be independently configured as pulse width modulated drivers for each of drivers 22, 24, 26, 28, 30, 32, 34, and 36.

Figure 2:
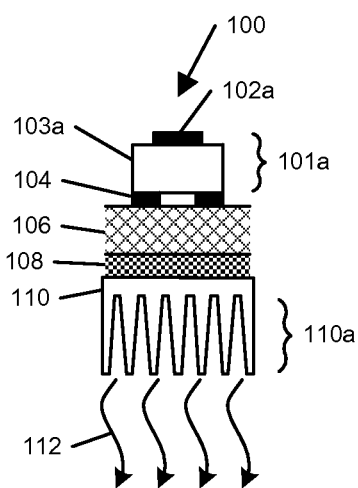
FIG. 2 shows a cross-section diagram of an LED device including an LED attached to a printed circuit (pc) board, which is attached to a thermal interface, which is attached to a heat sink in accordance with one or more embodiments of the present invention.
Figure 3A:
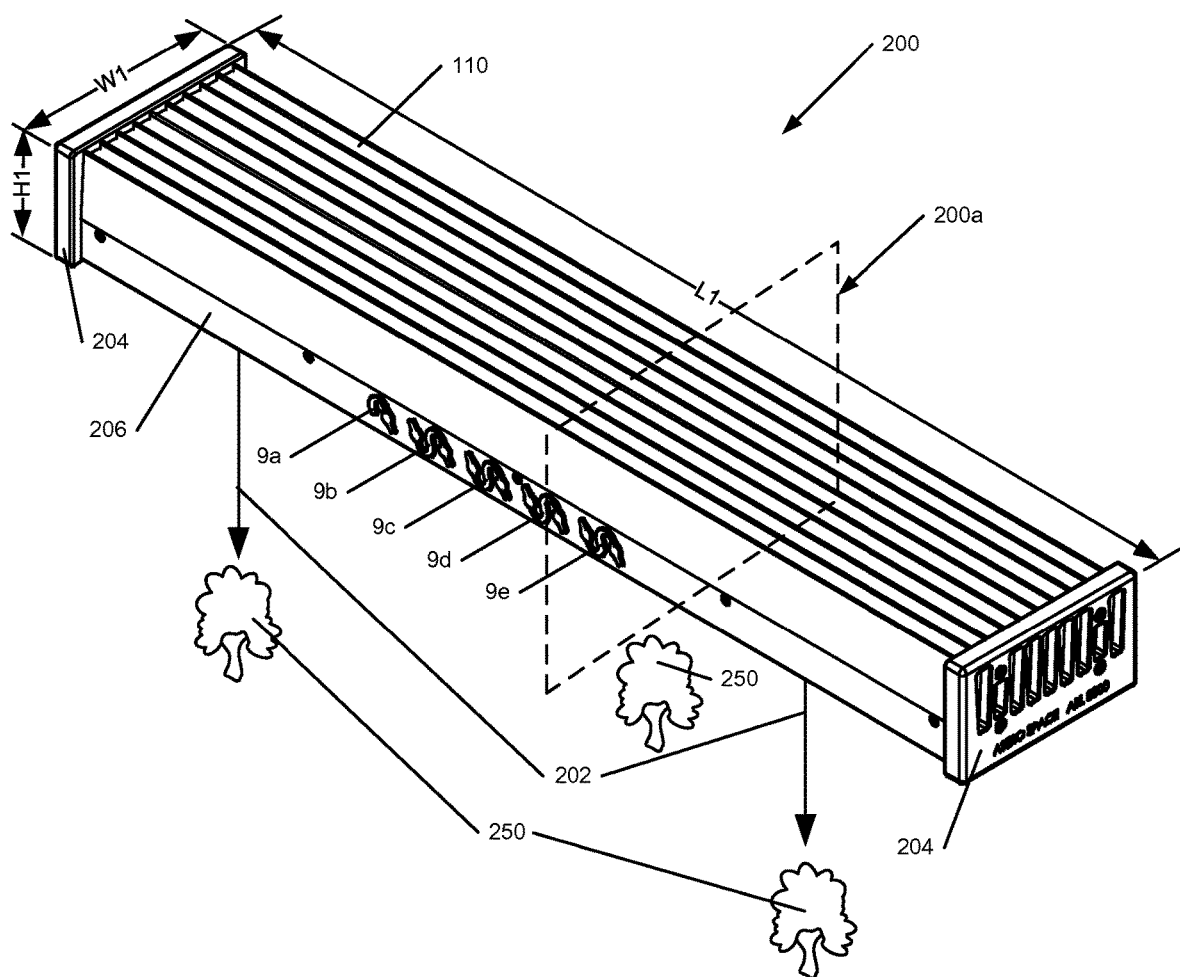
FIG. 3A shows a top, front, and right perspective view of one LED light model in accordance with an embodiment of the present invention.

FIG. 2 shows a cross-sectional view of an LED device and its mounting system 100, including an LED, 101a, having an LED die, 102a, a substrate with terminals (package or case), 103a, which is attached by a solder joint, 104, to a printed circuit board, 106, which is attached to a thermal interface, 108, which is attached to a heat sink, 110, which emits heat to the air, 112, in accordance with one or more embodiments of the present invention. In at least one embodiment, the heat sink, 110, is typically larger than the printed circuit board, 106. In addition, the heat sink, 110, is typically larger than the "field" of the plurality of LEDs, 101, which all are mounted on the pc board, 106. In at least one embodiment, the heat sink, 110, may be made of black anodized aluminum with fins, such as including fin, 110a, through which to dissipate heat, passively. A fan could be used in one or more embodiments, however a fan introduces reliability issues. A fan may reduce the size of heatsink and/or fins. In at least one embodiment the fins, such as fins, 110a, may have a width of about 4.625 inches, W1, and extend about 23.5 inches in length, L1, and may have a height H1, which is less than the width, W1, as shown in FIG. 3A. However other dimensions are possible. In at least one embodiment, it is critical that the heat sink, 110, is larger in length, or width, or both than the pc board, 106, and typically larger than the "field" or region on which the plurality of LEDs 101 are mounted on the pc board, 106.

Looking at FIG. 2 from a thermal perspective, a stack-up of thermal resistances occurs as a result of the LED device mounting system, device or apparatus, 100, through its intimate attachment to the heatsink, 110, and is described as follows: At the top of the diagram, 100, the die, 102a, operates at a higher temperature than ambient. There is a series of thermal gradients (temperature changes from high to low) as heat flows though the mounting system, device, or apparatus, 100; first through the thermal resistance of die, 102a, to case, 103a, ($\Theta_{ds}$), then through the thermal resistance of case, 103a, to board, 106, ($\Theta_{cb}$), then through the thermal resistance of the pc board, 106, itself ($\Theta_b$), then through the thermal resistance of board, 106, to heatsink, 110, ($\Theta_{bh}$), then through the thermal resistance of the heatsink, 110, itself ($\Theta_h$), and finally through the thermal resistance of the heatsink, 110, to air, 112, ($\Theta_{ha}$), where heat is radiated into the ambient air. The intimate arrangement of a plurality of LEDs, 101, shown in FIGS. 3B and 4, such as that which includes LED, 101a, of FIG. 2, through to the heatsink, 110, provides a minimal thermal gradient from LED die, 102a, to the surrounding air, at a minimum of cost, due to passive cooling. In extreme environments where high light intensity and ambient temperatures are encountered, active cooling may be provided through the use of a blower or fan as part of the light fixture. In such case, a cover over the heatsink, enclosing its fins, may be incorporated to facilitate proper airflow.

Each LED of each set of series connected string of LEDs, or channels, 38, 40, 42, 44, 46, 48, 50, and 52, may be similar to or the same as the LED, 101a, and may have the same or similar components as LED device, 101a, of FIG. 2. As mentioned above, each channel driver of channel drivers 22, 24, 26, 28, 30, 32, 34, and 36 can be optionally configured as a direct current (DC) or pulse with modulated (PWM) LED current driver. "White" LEDs can be incorporated in any of the strings 38, 40, 42, 44, 46, 48, 50, and 52 to provide full spectrum illumination under which operators may perform work, inspect plants or apparatus or safely navigate in what might be an otherwise poorly lighted area.

Since the efficiency of each LED, such as LED, 101a, and each further LED of each set of LED strings 38, 40, 42, 44, 46, 48, 50, and 52 (or plurality of LEDs, 101, shown in FIGS. 3B and 4) is dependent in part on die temperature, such as die, 102a, it is critical, in at least one embodiment, to keep this temperature rise above ambient temperature to a minimum. The apparatus, method, and/or system, 1, of FIG. 1, in at least one embodiment, provides a minimum of thermal resistance between the component die, such as die, 102a, of each LED device of the plurality of LED devices, 101, such as LED device, 101a, and ambient air as the heat is removed from the LED die, 102a, through its part's package, 103a, then through the solder joints 104, then through a printed circuit board, 106, through the thermal interface, 108, through the heat sink, 110, and finally to the surrounding air, 212, as shown by FIG. 2. This minimal thermal path is facilitated by attaching each printed board, such as printed circuit board, 106, upon which all LEDs of the plurality of LEDs, 101, such as LED device, 101a, are soldered to a pc board, 106, which is attached to a heat sink, 110, through a thermally conductive, electrically insulating, gel pad or thermal interface, 108. The printed circuit board, 106, may be constructed of 2 oz. copper layers connected by multiple and strategically placed thermal vias throughout to promote heat flow and reduce the thermal gradient it imposes on the system. The thermal interface, 108, may be made of a mechanically compliant, thermally conductive, electrical insulator. The heat sink, 110, may be massive in at least one embodiment, and may run the full length and width of the one or all printed circuit board(s), shown as printed circuit board, 106, supporting all of the LED devices, 101, similar to or identical to device, 101a, in LED strings 38, 40, 42, 44, 46, 48, 50, and 52. This configuration promotes dissipation of the heat to the ambient air, 112, with a minimal total thermal gradient from LED die, 102a, to the surrounding air, 112.

The direct efficiency of the lighting system, method and/or apparatus 1, is enhanced not only by the efficiency in which the LEDs of each of the strings, 38, 40, 42, 44, 46, 48, 50, and 52, convert electrical energy into photon energy, but also by the high-efficiency converters used within the drivers, 22, 24, 26, 28, 30, 32, 34, and 36, for the eight channels, the master power supply, 6, and the housekeeping supplies, 11, which are shown in diagram 1 of FIG. 1. Moreover, this particular lighting system offers a considerable efficiency advantage over all other non-LED lighting systems, as well as some of the LED fixtures currently available, in one or more embodiments. This is due in large part to the fact that power is not wasted producing light in frequency ranges not efficiently used in photosynthesis. A blatant example is the fact that when you look at a plant you see green. That's because the green wavelength is not absorbed as much as the other colors and is reflected back to the observer and, in part to the fact that the human eye's response to green light is particularly high. Typically, photosynthesis in plants is only minimally active in the regions of green, yellow and orange color frequencies. This system of lighting not only allows one to limit those wavelengths of light that are minimally or non-photosynthetically active, but also to customize or select those wavelengths of light that are specifically appropriate for various plants. In providing this customization, this system offers the possibility of considerable efficiency improvements over those currently available.

Other less apparent, but nonetheless significant, gains in overall efficiency in greenhouses and especially growth chambers comes as a result of not having to remove heat that is generated by other less efficient lighting systems that introduce unwanted heat into the surrounding environment. Another important feature of the LED lighting method, apparatus, and/or system 1 of FIG. 1, in at least one embodiment is that, each light fixture may be powered by a universal input, power factor corrected, voltage regulating, master power supply, 6, that can be remotely located, removing its contribution of heat from growth chambers or other confined areas where the light is mounted. Mounting the master power supply, 6, outside of the growing chambers/areas can reduce the amount of heat transferred into these environments by an additional 10% or more over other systems.

Further gains of efficiency can be achieved using this lighting system, since not only does it not provide light in frequencies where there is little or no photosynthetic activity and allow for the customization of wavelength channels, as described above, but one can adjust the output of each frequency to be optimum for any given plant. This includes the ability to reduce the output of the light so as not to over expose plants to a light intensity that may be counterproductive. Other lighting systems on the market today simply do not provide all of these features.

Figure 5:
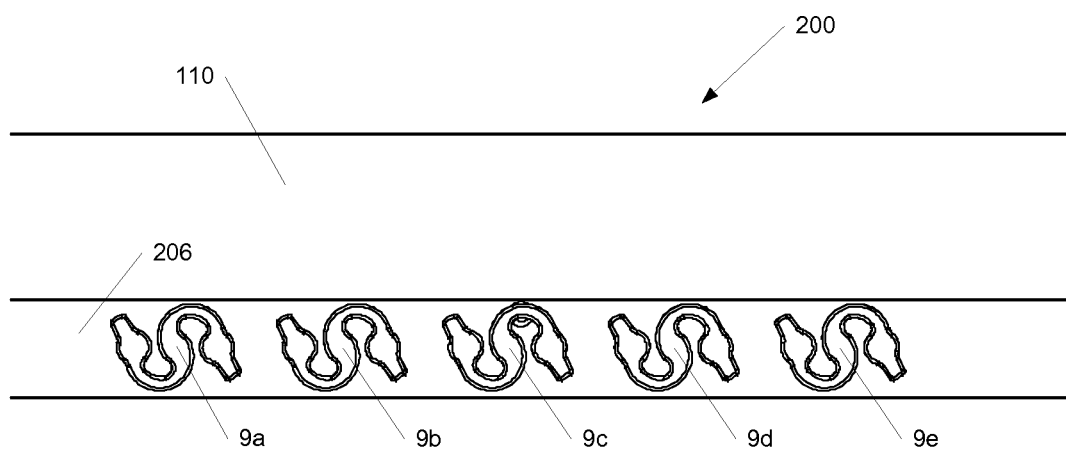
FIG. 5 shows a diagram of the adjustment port plugs (closed) for manual control.
Figure 6:
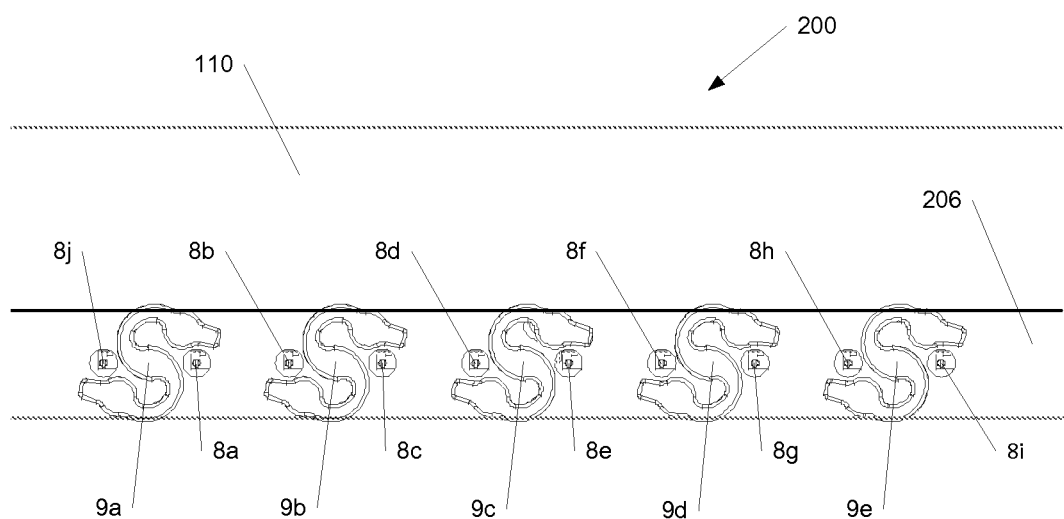
FIG. 6 shows a diagram of the adjustment ports with plugs open for manual adjustment of the control.

As mentioned above, this lighting system, apparatus and/or method of one or more embodiments of the present application has two base options: a) the manual model and b) the automated (i.e., computer controlled) model. In the manually controlled model, each channel, of channels 38, 40, 42, 44, 46, 48, 50, and 52, may have its own intensity control, 8b-8h, in FIG. 6, respectively, that can be used to adjust the intensity of its LEDs from zero (fully counter-clockwise, CCW) to maximum (fully clockwise, CW). A master intensity control, 8a, in FIG. 6, for manual models) is also provided as a convenient means of adjusting all of the channels' intensities (for all of channels 38, 40, 42, 44, 46, 48, 50, and 52), simultaneously. The master intensity control modulates all of the individual channel controls through specially designed multiplier circuits on the control input of each of the channel drivers, 22, 24, 26, 28, 30, 32, 34, and 36. This is what provides the ability of common intensity adjustment of all channels with the master control, while allowing for independent adjustment of each channel by their respective channel controls. Each of these adjustment potentiometers, master and channels 38, 40, 42, 44, 46, 48, 50, and 52, may be accessed through adjustment hole plugs, 9a, 9b, 9c, 9d and 9e, that can be unplugged and rotated to allow access to the adjusting potentiometers through ports in the side panel, 206 shown closed in FIG. 5 and open in FIG. 6.

Adjustment of this lighting system would be made as follows: Starting with channel adjustment potentiometers, 8a-8i, for corresponding LED strings, 38, 40, 42, 44, 46, 48, 50, and 52, as well as the master intensity control potentiometer, 8a, of LED lighting fixture, 200, in FIGS. 3A and 3B, at maximum (fully clockwise), set each of the eight channel adjustment potentiometers, 8b-8i, of control device, 8, in FIG. 6, to achieve the desired spectral profile. Then, reduce the master control potentiometer, 8a, of control device, 8, until the desired level of overall light intensity is obtained, which in fact, may remain at maximum. Turning the adjustment screws of the adjustment potentiometers clockwise, increases the intensity (current level) of their respective LED string. Conversely, counter-clockwise rotation reduces intensity (current level). Dust, debris and moisture protection of the adjustment pots and other associated components of the control device is provided by specially designed self-retaining potentiometer adjustment access hole plugs, 9a-9e, in FIG. 5.

An optional adjustment, 8j, may be provided to adjust the overall reference voltage to the control circuits. This may be useful in situations where extremely low light intensities as well as fine granularity of adjustment are required and is necessary only when operating the drivers in PWM mode. This port, 8j, would be located next to the master adjustment port, 8a, behind port plug, 9a.

Figure 3B:
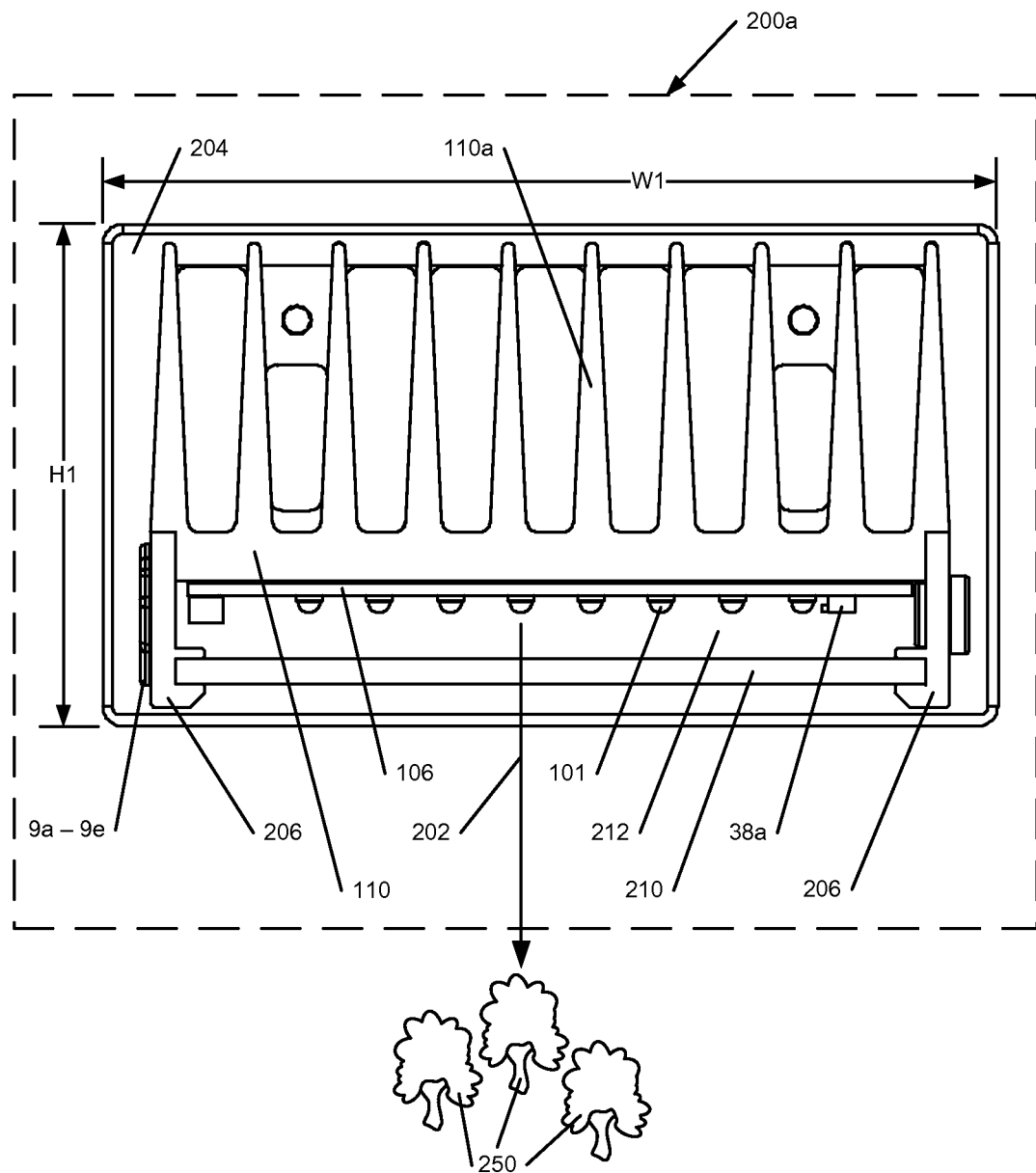
FIG. 3B shows a cross-sectional view of light model shown in FIG. 3A in accordance with an embodiment of the present invention.
Figure 4:
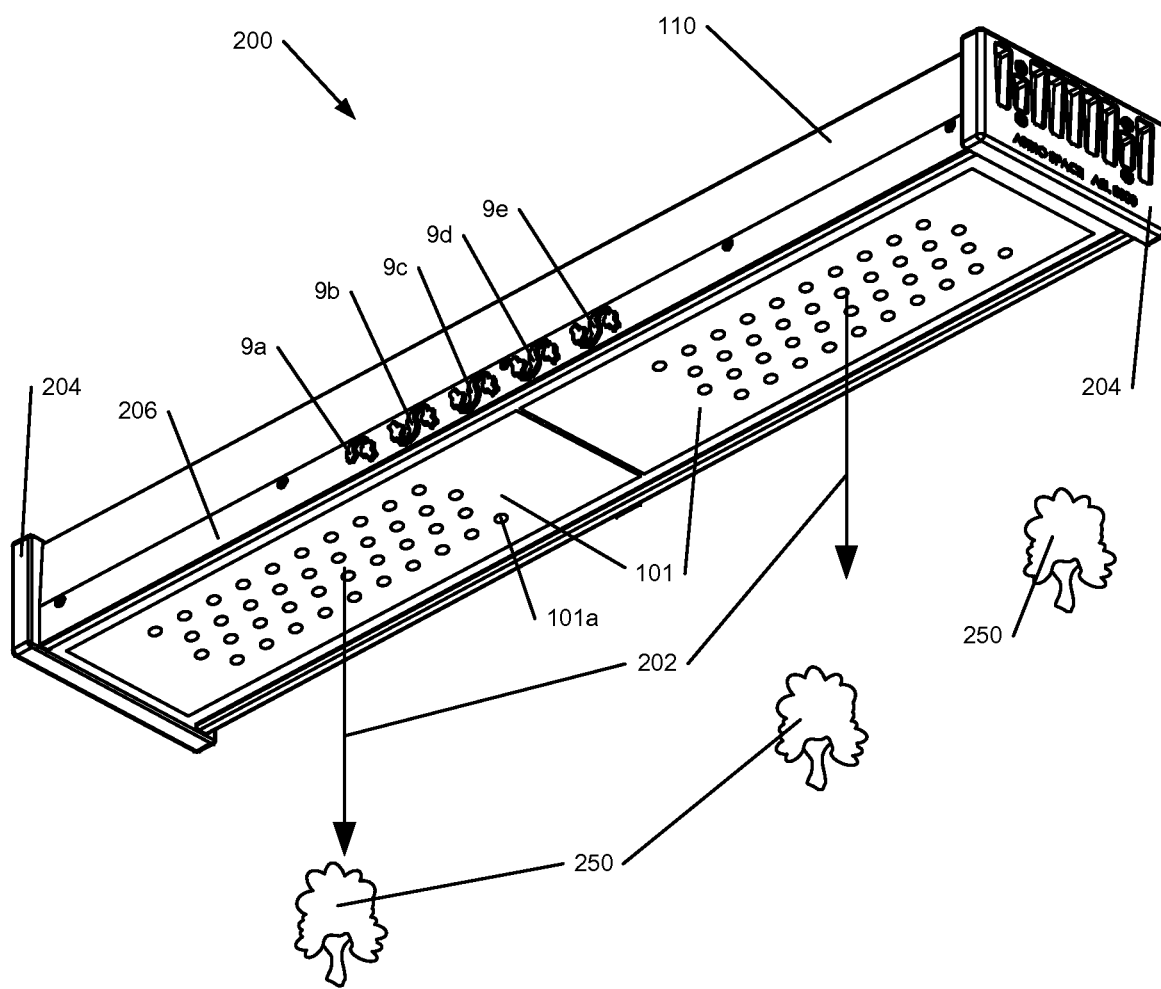
FIG. 4 shows a bottom, front, and right perspective view of the LED light model of FIG. 3A.

In FIG. 4, the direction of light, 202, emitted from a plurality of LEDs, 101, including LED, 101a, directed at vegetation, 250, is shown. FIGS. 3A, 3B and 4 also show the direction of the light, 202, emitted from the plurality of LEDs, 101, to vegetation, 250. However the LEDs, 101, are not visible in FIG. 3A.

FIG. 3B is a cross-sectional view, 200a, of the area, 200a, indicated in FIG. 3A. It shows a sealed compartment, 212, created by the heatsink, 110, side panels, 206, end caps, 204, adjustment plugs, 9a-9e and transparent panel, 210. Not fully apparent in FIG. 3B is the clear opening below the transparent panel, 212, through which light, 202, may pass unimpeded (downward in the diagram). This is due to the lower outline of the far-end, end cap, 204 being shown in the cross-sectional view.

Figure 10:
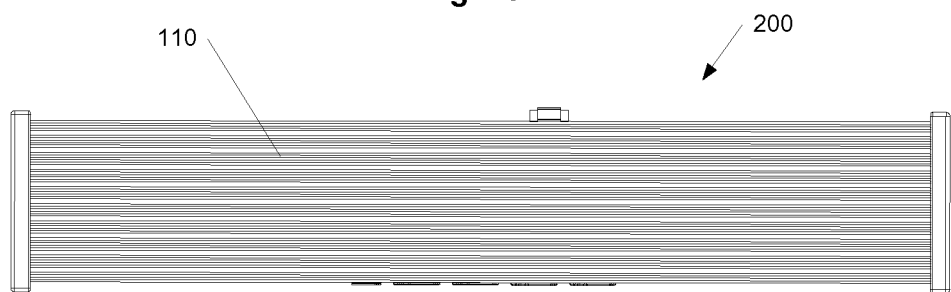
FIG. 10 shows a top view of a typical twenty-four inch LED light fixture (viewed from heatsink fins)
Figure 11:
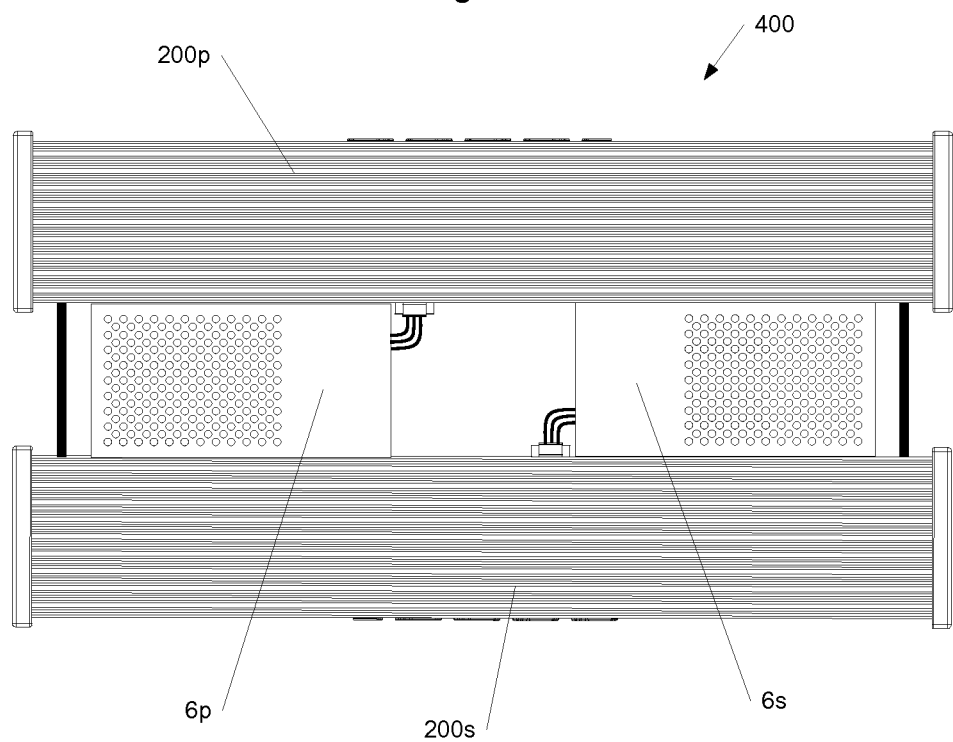
FIG. 11 shows an LED lighting fixture comprised of two heat sink assemblies, and two master power supplies, in accordance with another embodiment of the present invention.

The lighting system, apparatus, and/or method 1 of FIG. 1 is modular in so much as it can be implemented, for example, as a four inch by twelve inch fixture, using only one printed circuit board, a four inch by twenty-four inch fixture using two printed circuit boards installed on one heatsink, as shown in 200 of FIG. 10, or as a dual four inch by twenty four inch fixture 400 of FIG. 11, using four pc boards in two units, 200p and 200s, The latter of which may have the Master power supplies 6p and 6s of 400 in FIG. 11, mounted between the two heatsinks. This configuration would be intended for greenhouses or other large area lighting applications. In every case mentioned, size stated in inches implies a nominal size. Actual dimensions may vary from nominal.

Optionally, this or any manifestation (one, two or four printed board system) of this lighting fixture may be equipped with a digital control interface, 12, shown in FIG. 1. The digital control interface, 12, replaces manually adjustable potentiometers, 8a-8h, shown in FIG. 6, with a graphic user interface (GUI) resembling that of an audio equalizer. In the digital control interface, 12, of 100 in FIG. 1, there would be individual intensity adjustments for each channel, as well as, a master intensity control and optional reference control. The master control would modulate the output intensity of all channels, simultaneously, and the reference control would modulate the reference voltage which serves as an input to all other controls, as in the manual model. This would make it easy for the user to adjust the spectral profile of any given light fixture, of any size array, to that desired, with the benefit of a graphical representation. Not only would one be able to adjust the output wavelength profile of all the lights connected to the system, but also that of subgroups of light fixtures as small in number as only one, to that desired to accommodate various crops throughout the greenhouse or growth chamber.

Another great advantage of an automated system, in accordance with one or more embodiments of the present invention is the added ability to adjust lighting requirements (and of course, spectral profiles) in real time. For example, in the northwestern hemisphere, the United States, where poinsettias are grown for the Christmas holidays, the plants must be conditioned with light and dark-times of twelve hours, each, for a period of one month starting at the end of September. Instead of having to turn all lights on simultaneously, which may cause an undesirable peak demand on electric power, the lights could come on gradually minimizing undesirable peak demands without the need for the operator to be physically present in the growing environment to conduct the transition. Other benefits of gradually increasing the intensity of light are being studied. It has been suggested that it may be beneficial to introduce and remove light to and from many plants through a gradual increase or decrease in intensity of various wavelengths, much like the sun provides when it rises and sets each day. An option available to the digital control interface, 12, is network connection, 14, in the form of wireless, 18, or direct network (e.g., Ethernet, HPIB, S-bus, etc.), 16, connection, across which the user inputs would be transmitted to the light fixture(s).

In addition to all these other benefits offered by the digital control interface, 12, another benefit is telemetry. One can monitor the status of light fixtures without having to be in close proximity to or even see them. The user can set outputs and monitor the status of each channel concerning channel drivers 22, 24, 26, 28, 30, 32, 34, and 36, within each light controlled by this interface on any computer or hand-held device such as an iPhone (trademarked), iPad (trademarked), etc. Although this LED lighting system's reliability exceeds that of most, if not all, other types of greenhouse lighting systems, there can be rare failures. Fortunately, most failures can be readily identified through the telemetry displayed on the graphic user interface. This simplifies maintenance insomuch as the faulty unit can be located by maintenance personnel with ease.

Among the telemetry options provided are voltage and current output of the master power supply, 6, current through each LED string (channel) 38, 40, 42, 44, 46, 48, 50, and 52, voltage on each string (a voltage too high would indicate an open, too low may indicate shorted LED(s) or undercurrent) and temperature of each PC board (typically one for each four inch by twelve inch board).

In another embodiment of the present invention, sensors, 38a, 40a, 42a, 44a, 46a, 48a, 50a, and 52a, are provided as shown in FIG. 1, and may be placed to sense light intensity of each of the channels, 38, 40, 42, 44, 46, 48, 50, and 52, and/or of the LEDs of each of the channels, thus allowing direct intensity telemetry and the option of a closed loop control lighting system. An embodiment of one such LED and light sensor, 38a, is shown in FIG. 3B. In at least one embodiment, the closed-loop signal flow of one of the control loops is as follows: a command signal is generated in the digital control interface, 12, sent across the control and telemetry Bus, 2, to the respective channel driver, (22 in this example), which generates a current in the string of its respective LEDs, which in turn induces a corresponding intensity of light to be emitted from that string of LEDs, (38 in this example). A sensor placed in close proximity to one of the LEDs and the corresponding string of LEDs, (38a in this example), responds to the light emitted from that diode sending a telemetry signal back through the control and telemetry Bus, 2, to the digital control interface, 12. At the digital control Interface, 12, the telemetry signal is compared to a reference signal, supplied by user inputs, 20b, generating an error signal, which causes the control output of the digital control interface, 12, to be increased or decreased as necessary to ensure that the telemetry signal is always equal to the reference signal at the inputs to a comparator of the digital control interface, 12. This completes the full control loop of one of as many as eight channels within the LED light system. In this manner, the light intensity of each LED of the plurality of LEDs of sets or strings 38, 40, 42, 44, 46, 48, 50, and 52 can be sensed to make sure that a plant or vegetation is always getting the proper light intensity. The control device, 8, may include a computer processor and memory, programmed so that the light intensity of sets 38, 40, 42, 44, 46, 48, 50, and 52 is adjusted in response to sensed light intensity from the sensors 38a, 40a, 42a, 44a, 46a, 48a, 50a, and 52a, respectively.

Figure 7:
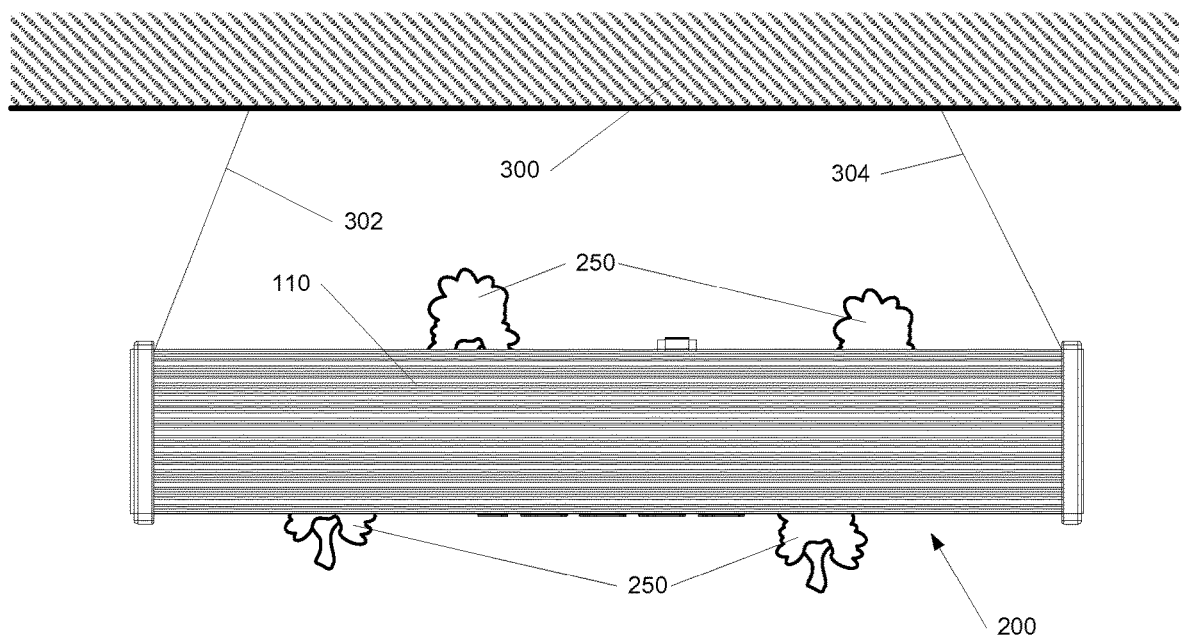
FIG. 7 shows a diagram of one embodiment of the design, method, apparatus, and system, mounted by cables, to a wall or other structure. This is an example of a horizontally mounted, omnidirectional, lateral emitting, LED light fixture (light is emitted away from you, as drawn here)
Figure 8:
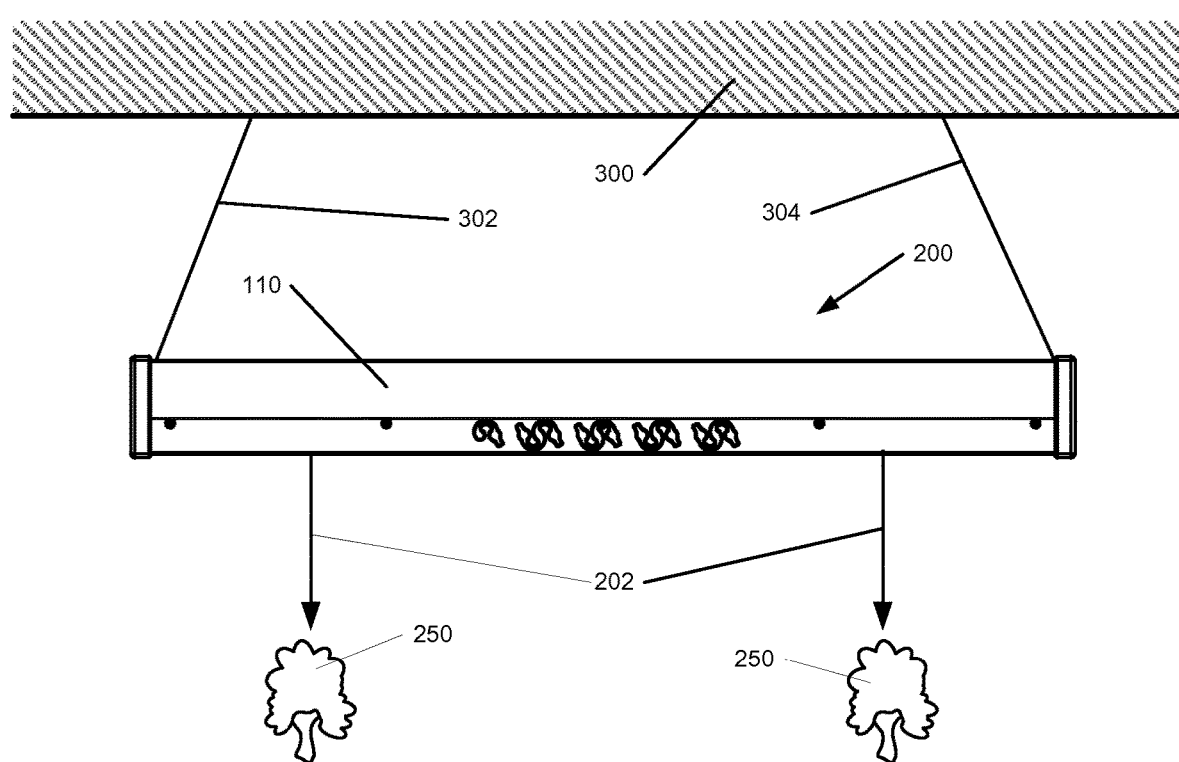
FIG. 8 shows device of FIG. 7, mounted by cables, to the wall, overhead or other supporting structure, with the mounting in a different orientation from FIG. 7.
Figure 9:
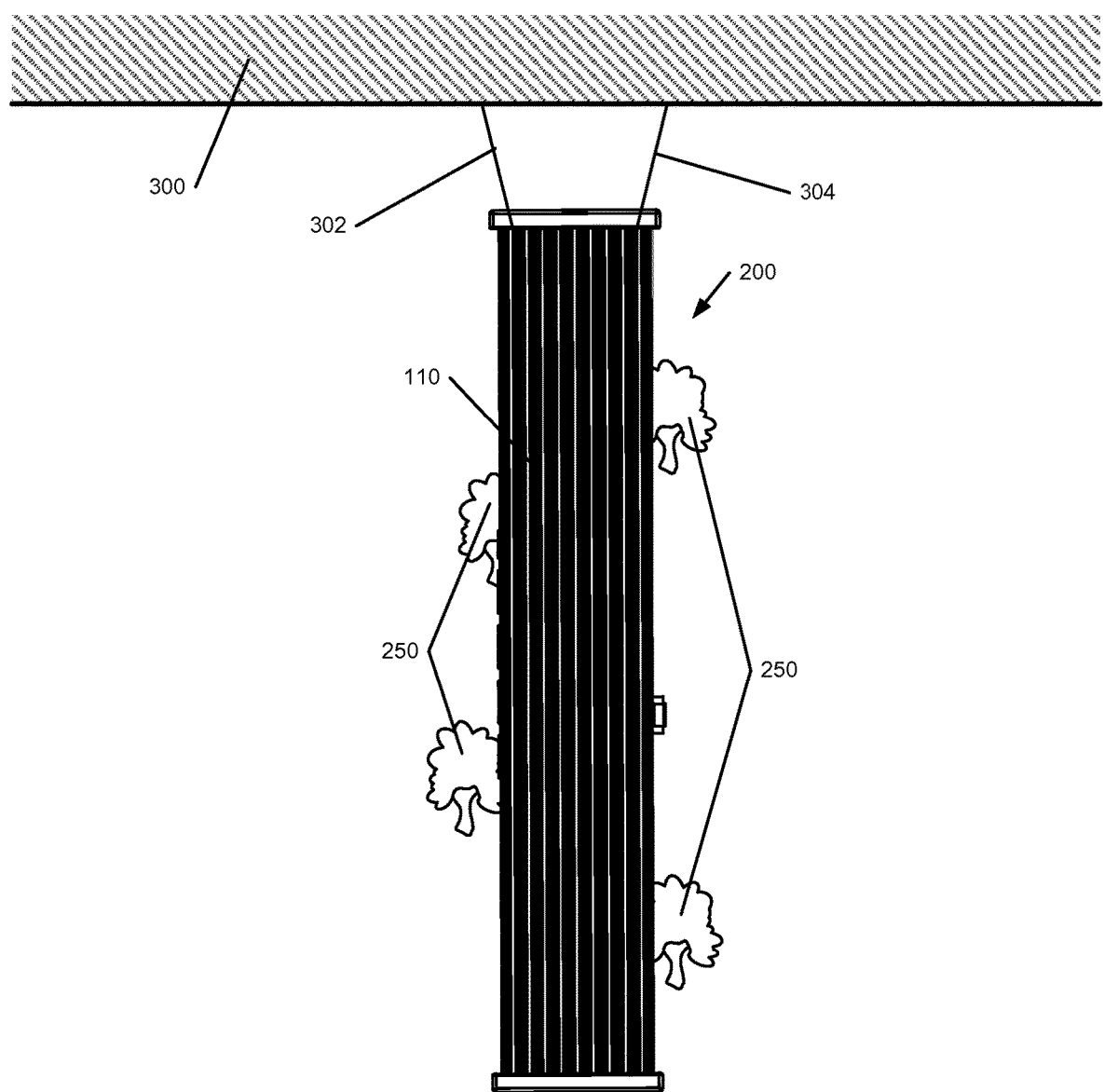
FIG. 9 shows the device of FIG. 7, mounted by cables, to a wall, overhead or other supporting structure, so that the LED lighting fixture is mounted in a different orientation from FIGS. 7 and 8. This is an example of a vertically mounted, omnidirectional, lateral emitting, LED light fixture in which light is emitted away from you, as drawn.

The light system, apparatus, and/or method may be mounted either horizontally with heatsink fins facing laterally (lateral omnidirectional illumination), horizontally with heatsink fins facing up (vertical illumination), or vertically (vertical omnidirectional illumination) with, of course, heatsink fins facing in any direction, all mountings of which are as shown in FIG. 7, FIG. 8, and FIG. 9, respectively.

FIG. 7 shows a diagram of an LED lighting fixture, 200, mounted by cables 302 and 304, to a wall, 300, or other structure. This is an example of a horizontally mounted, omnidirectional, lateral emitting, LED light fixture (light is emitted away from you, at the vegetation, 250, as drawn here).

FIG. 8 shows a diagram of a horizontally mounted, vertical emitting, LED light fixture (light is emitted down, as drawn here). This is an example of an LED lighting fixture, 200, mounted by cables, 302 and 304, to the wall overhead or other supporting structure, 300, with the mounting in a different orientation from FIG. 7. FIG. 8 also shows the direction, 202, of light emitted from the plurality (pc board) of LEDs 101 (not shown). This is an example of a horizontally mounted, vertical emitting, LED light fixture (light, 202, is emitted down, towards the vegetation, 250, as drawn here).

FIG. 9 shows an LED lighting fixture, 200, mounted by cables, 302 and 304, to the wall or structure, 300, so that the LED lighting fixture, 200, is in a different orientation from FIGS. 7 and 8. This is an example of a vertically mounted, omnidirectional, lateral emitting, LED light fixture in which light is emitted away from you, towards the vegetation, 250, which are behind the light, as drawn. The LED lighting fixture, 200, may be controlled manually or by a computer processor, which may be set and communicated to via another smart device over a wired or wireless network.

FIG. 10 shows a top view of a diagram of a typical twenty-four inch LED lighting fixture, 200, of an LED light fixture model (viewed from fin-side of heatsink).

FIG. 11 shows an apparatus, 400, including LED lighting fixtures, 200*p* and 200*s*, and master power supplies 6*p* and 6*s*, in accordance with another embodiment of the present invention. Each of the two heat sinks, of 200*p* and 200*s*, may be the same as heat sink, 110. Each of power supplies 6*p* and 6*s* may be the same as power supply, 6, or combined into one supply. FIG. 11 is a diagram of at least one configuration of a dual twenty-four inch LED light fixture model (viewed from heatsinks), that would typically be deployed in large growing areas and greenhouses.

Twin four inch by twelve inch lighting fixtures, 400 in FIG. 11, can be used to replace existing high-pressure sodium, metal halide or florescent lighting fixtures in large chambers or greenhouses. As many as one thousand lighting fixtures (optionally more) can be controlled with this system. A twelve inch configuration of the lighting fixture is possible and is similar to, but of course shorter than, that of FIG. 10, above.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method, comprising:
   mounting a light emitting device so that light from a plurality of sets of light emitting diodes of the light emitting device is directed toward vegetation;
   choosing a predominant wavelength for each set of the plurality of sets of light emitting diodes; and
   controlling an intensity of light from the plurality of sets of light emitting diodes directed toward the vegetation;
   wherein each set of the plurality of sets of light emitting diodes includes one or more light emitting diodes;
   wherein the light emitting device further includes a control device for controlling the intensity of light of each set of light emitting diodes of the plurality of sets of light emitting diodes;
   wherein each set of the plurality of sets emits light in a frequency band of light of the corresponding chosen predominant wavelength;
   wherein the plurality of sets emits a plurality of corresponding wavelengths of light as determined by the chosen predominant wavelength of each set of the plurality of sets;
   wherein the intensity of light from the plurality of sets of light emitting diodes directed towards vegetation is controlled by varying one or more signals that are supplied to the plurality of sets of light emitting diodes to thereby vary the intensity of light emitted by each of the plurality of sets of light emitting diodes in the frequency band of light having the chosen predominant wavelength of each set of the plurality of sets of light emitting diodes; and
   wherein the intensity of light emitted by each of the plurality of sets of light emitting diodes is varied by continuously varying current in each of the plurality of sets of light emitting diodes to thereby continuously vary a level of light intensity for each of the plurality of sets of light emitting diodes from a minimum level of light intensity to a maximum level of light intensity.

2. The method of claim 1, wherein the intensity of light from the plurality of sets of light emitting diodes directed toward the vegetation is controlled so that the intensity of light of each of the sets of light emitting diodes, in the frequency band of light having the chosen predominant wavelength for each of the sets of light emitting diodes, follows a periodic cycle during which the intensity of light gradually increases in intensity to a peak intensity and then gradually decreases in intensity to an intensity low, and then gradually increases again to a next peak intensity.

3. The method of claim 2, wherein the periodic cycle occurs over a period of a twenty-four hour day.

4. The method of claim 2, wherein the periodic cycle is repeated for a plurality of cycles.

5. The method of claim 2, wherein the periodic cycle has a period which varies over time for a plurality of high and low light intensity cycles.

6. A method, comprising:
   mounting a light emitting device so that light from a plurality of sets of light emitting diodes of the light emitting device is directed toward vegetation;
   choosing a predominant wavelength for each set of the plurality of sets of light emitting diodes; and
   controlling an intensity of light from the plurality of sets of light emitting diodes directed toward the vegetation;
   wherein each set of the plurality of sets of light emitting diodes includes one or more light emitting diodes;
   wherein the light emitting device further includes a control device for controlling the intensity of light of each set of light emitting diode of the plurality of sets of light emitting diodes;
   wherein each set of the plurality of sets emits light in a frequency band of light of the corresponding chosen predominant wavelength;

wherein the plurality of sets emits a plurality of corresponding wavelengths of light as determined by the chosen predominant wavelength of each set of the plurality of sets; and the method further comprising controlling the intensity of light from the plurality of sets of light emitting diodes directed toward the vegetation so that the intensity of light of each of the sets of light emitting diodes follows a periodic cycle during which the intensity of light gradually increases in intensity to a peak intensity and then gradually decreases in intensity to an intensity low, and then gradually increases again to a next peak intensity, wherein the peak intensity for each wavelength differs depending on a time of year.

7. The method of claim 6, wherein the periodic cycle is repeated for a plurality of cycles.

8. A method, comprising:

mounting a light emitting device so that light from a plurality of sets of light emitting diodes of the light emitting device is directed toward vegetation;

choosing a predominant wavelength for each set of the plurality of sets of light emitting diodes; and controlling an intensity of light from the plurality of sets of light emitting diodes directed toward the vegetation;

wherein each set of the plurality of sets of light emitting diodes includes one or more light emitting diodes;

wherein the light emitting device further includes a control device for controlling the intensity of light of each set of light emitting diode of the plurality of sets of light emitting diodes;

wherein each set of the plurality of sets emits light in a frequency band of light of the corresponding chosen predominant wavelength;

wherein the plurality of sets emits a plurality of corresponding wavelengths of light as determined by the chosen predominant wavelength of each set of the plurality of sets; and the method further comprising controlling the intensity of light from the plurality of sets of light emitting diodes directed toward the vegetation so that the intensity of light of each of the sets of light emitting diodes follows a periodic cycle during which the intensity of light gradually increases in intensity to a peak intensity and then gradually decreases in intensity to an intensity low, and then gradually increases again to a next peak intensity, wherein the intensity low for each wavelength differs depending on a time of year.

9. A method, comprising:

mounting a light emitting device so that light from a plurality of sets of light emitting diodes of the light emitting device is directed toward vegetation;

choosing a predominant wavelength for each set of the plurality of sets of light emitting diodes; and controlling an intensity of light from the plurality of sets of light emitting diodes directed toward the vegetation;

wherein each set of the plurality of sets of light emitting diodes includes one or more light emitting diodes;

wherein the light emitting device further includes a control device for controlling the intensity of light of each set of light emitting diode of the plurality of sets of light emitting diodes;

wherein each set of the plurality of sets emits light in a frequency band of light of the corresponding chosen predominant wavelength;

wherein the plurality of sets emits a plurality of corresponding wavelengths of light as determined by the chosen predominant wavelength of each set of the plurality of sets; and wherein the intensity of light of each set of the plurality of sets is controlled by the control device based on a light intensity sensed by a plurality of sensors, one for each set of the plurality of sets.

10. A method, comprising:

mounting a light emitting device so that light from a plurality of sets of light emitting diodes of the light emitting device is directed toward vegetation;

choosing a predominant wavelength for each set of the plurality of sets of light emitting diodes; and controlling an intensity of light from the plurality of sets of light emitting diodes directed toward the vegetation;

wherein each set of the plurality of sets of light emitting diodes includes one or more light emitting diodes;

wherein the light emitting device further includes a control device for controlling the intensity of light of each set of light emitting diodes of the plurality of sets of light emitting diodes;

wherein each set of the plurality of sets emits light in a frequency band of light of the corresponding chosen predominant wavelength;

wherein the plurality of sets emits a plurality of corresponding wavelengths of light as determined by the chosen predominant wavelength of each set of the plurality of sets;

wherein the intensity of light from the plurality of sets of light emitting diodes directed towards vegetation is controlled by varying one or more signals that are supplied to the plurality of sets of light emitting diodes to thereby vary the intensity of light emitted by each of the plurality of sets of light emitting diodes in the frequency band of light having the chosen predominant wavelength of each set of the plurality of sets of light emitting diodes; and the method further comprises sensing a light intensity emitted by each set of the plurality of sets of light emitting diodes and based on the light intensity sensed for each set of the plurality of sets of light emitting diodes either increasing or decreasing a control signal provided to each set of the plurality of light emitting diodes to thereby increase or decrease, respectively, the intensity of light emitted by each set of the plurality of sets of light emitting diodes, in a frequency band of light having the chosen predominant wavelength for each set of the plurality of sets of light emitting diodes.

11. The method of claim 10, further comprising comparing the light intensity sensed with a reference signal for each of the plurality of sets of light emitting diodes in order to determine whether to increase or decrease the control signal provided to each set of the plurality of sets of light emitting diodes.

12. A method comprising mounting a light emitting device so that light from a plurality of sets of light emitting diodes of the light emitting device is directed toward vegetation;

choosing a predominant wavelength for each set of the plurality of sets of light emitting diodes; and controlling an intensity of light from the plurality of sets of light emitting diodes directed toward the vegetation;

wherein each set of the plurality of sets of light emitting diodes includes one or more light emitting diodes;

wherein the light emitting device further includes a control device for controlling the intensity of light of each set of light emitting diodes of the plurality of sets of light emitting diodes;

wherein each set of the plurality of sets emits light in a frequency band of light of the corresponding chosen predominant wavelength;

wherein the plurality of sets emits a plurality of corresponding wavelengths of light as determined by the chosen predominant wavelength of each set of the plurality of sets;

wherein the intensity of light from the plurality of sets of light emitting diodes directed towards vegetation is controlled by varying one or more signals that are supplied to the plurality of sets of light emitting diodes to thereby vary the intensity of light emitted by each of the plurality of sets of light emitting diodes in the frequency band of light having the chosen predominant wavelength of each set of the plurality of sets of light emitting diodes;

wherein the intensity of light from the plurality of sets of light emitting diodes directed toward the vegetation is controlled so that the intensity of light of each of the sets of light emitting diodes, in the frequency band of light having the chosen predominant wavelength for each of the sets of light emitting diodes, follows a periodic cycle during which the intensity of light gradually increases in intensity to a peak intensity and then gradually decreases in intensity to an intensity low, and then gradually increases again to a next peak intensity; and wherein the intensity low, the peak intensity, and a rate of change from the intensity low to the peak intensity and from the peak intensity back to the intensity low for the periodic cycle, are varied, for each of the plurality of sets of light emitting diodes, depending on a current season of a year.

13. The method of claim 12, further comprising setting the intensity of light emitted by each of the plurality of sets of light emitting diodes to a desired level of light intensity which is between the intensity low and the peak intensity.

* * * * *